United States Patent
Miki

(10) Patent No.: US 10,800,252 B2
(45) Date of Patent: Oct. 13, 2020

(54) RESIN FUEL TANK AND BLOW MOLDING MOLD FOR MOLDING THE SAME

(71) Applicant: TOYOTA JIDOSHA KABUSHIKI KAISHA, Toyota-shi, Aichi-ken (JP)

(72) Inventor: Masaharu Miki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 324 days.

(21) Appl. No.: 15/814,887

(22) Filed: Nov. 16, 2017

(65) Prior Publication Data

US 2018/0201124 A1    Jul. 19, 2018

(30) Foreign Application Priority Data

Jan. 16, 2017    (JP) .................. 2017-005467

(51) Int. Cl.

| | |
|---|---|
| *B60K 15/03* | (2006.01) |
| *B60K 15/06* | (2006.01) |
| *B60K 15/067* | (2006.01) |
| B29L 31/00 | (2006.01) |
| B29C 43/00 | (2006.01) |
| B29C 49/48 | (2006.01) |
| B60K 15/063 | (2006.01) |
| B29C 49/04 | (2006.01) |
| B29C 49/20 | (2006.01) |

(52) U.S. Cl.
CPC ...... *B60K 15/03177* (2013.01); *B60K 15/067* (2013.01); *B29C 43/00* (2013.01); *B29C 49/04* (2013.01); *B29C 49/482* (2013.01); *B29C 2049/2069* (2013.01); *B29C 2049/4805* (2013.01); *B29C 2793/0054* (2013.01); *B29L 2031/7172* (2013.01); *B60K 2015/03032* (2013.01); *B60K 2015/03118* (2013.01); *B60K 2015/0636* (2013.01); *B60K 2015/0638* (2013.01)

(58) Field of Classification Search
CPC ........................ B60K 15/03177; B60K 15/067; B60K 15/03; B29C 43/00; B29C 49/04; B29C 49/4802; B29C 49/482
USPC ........ 220/562, 555, 554, 553, 651; 264/454, 264/535
See application file for complete search history.

(56) References Cited

U.S. PATENT DOCUMENTS 4,886,180 A * 12/1989 Bonczyk ................ B60K 15/00
                                                                220/646
5,398,839 A * 3/1995 Kleyn .............. B60K 15/03177
                                                                220/4.14

(Continued)

FOREIGN PATENT DOCUMENTS

| CN | 1935554 A | 3/2007 |
|---|---|---|
| JP | S54-72271 A | 6/1979 |
| JP | 2014-148227 A | 8/2014 |

*Primary Examiner* — Robert J Hicks
(74) *Attorney, Agent, or Firm* — Oliff PLC

(57) ABSTRACT

A resin fuel tank includes a peripheral wall portion that is configured to structure a portion of a fuel tank main body portion that is made of resin and in which fuel is stored, the peripheral wall portion having a parting line portion that is visible from an outer side of the fuel tank main body portion, and a projecting portion that is solid, is disposed along the parting line portion, and is configured to project outward, integrally with the peripheral wall portion, from the peripheral wall portion toward the outer side of the fuel tank main body portion.

1 Claim, 8 Drawing Sheets

(56) References Cited

U.S. PATENT DOCUMENTS

| | | | |
|---|---|---|---|
| 8,840,976 B2* | 9/2014 | Larson | C08G 18/56 |
| | | | 428/35.7 |
| 2006/0151505 A1* | 7/2006 | Kobayashi | B29C 45/14262 |
| | | | 220/562 |
| 2007/0065612 A1 | 3/2007 | Yamamoto et al. | |
| 2015/0367726 A1 | 12/2015 | Taniguchi et al. | |
| 2018/0128668 A1* | 5/2018 | Nakashima | B60K 15/03177 |

* cited by examiner

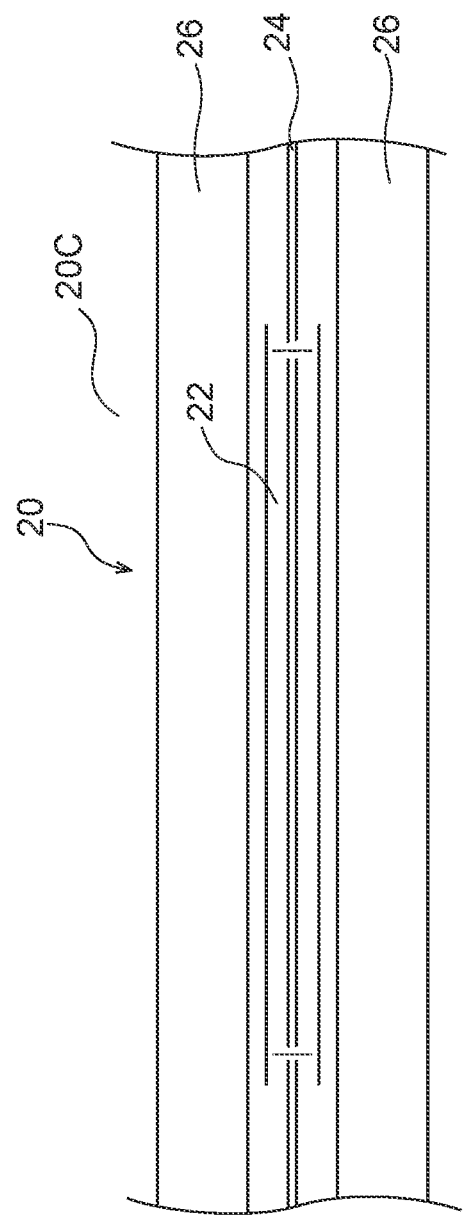

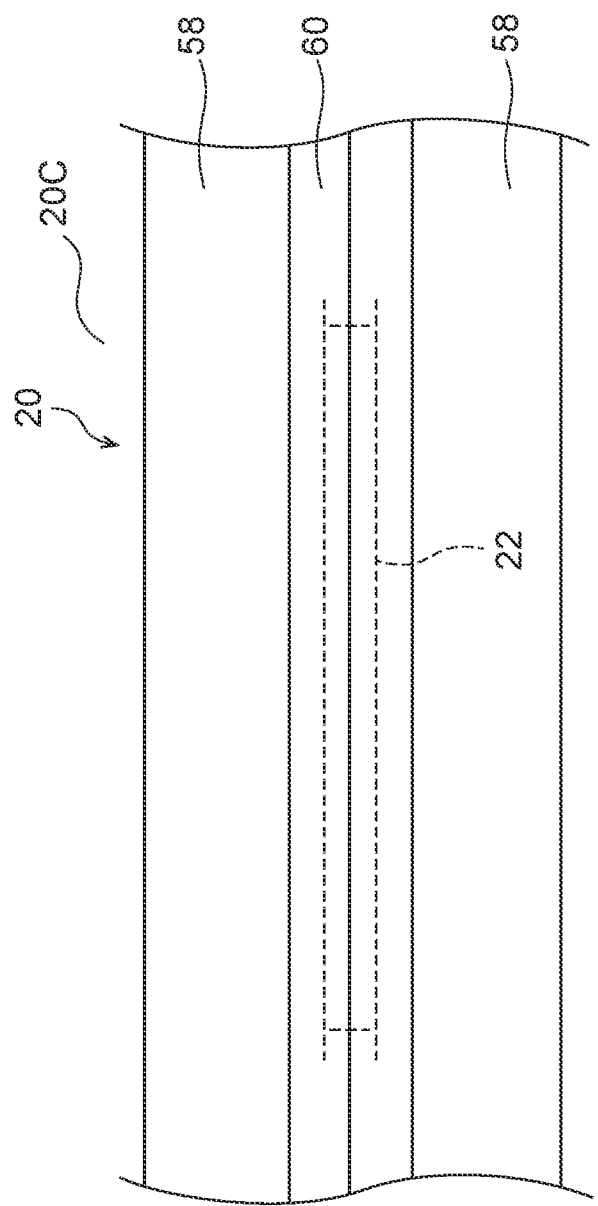

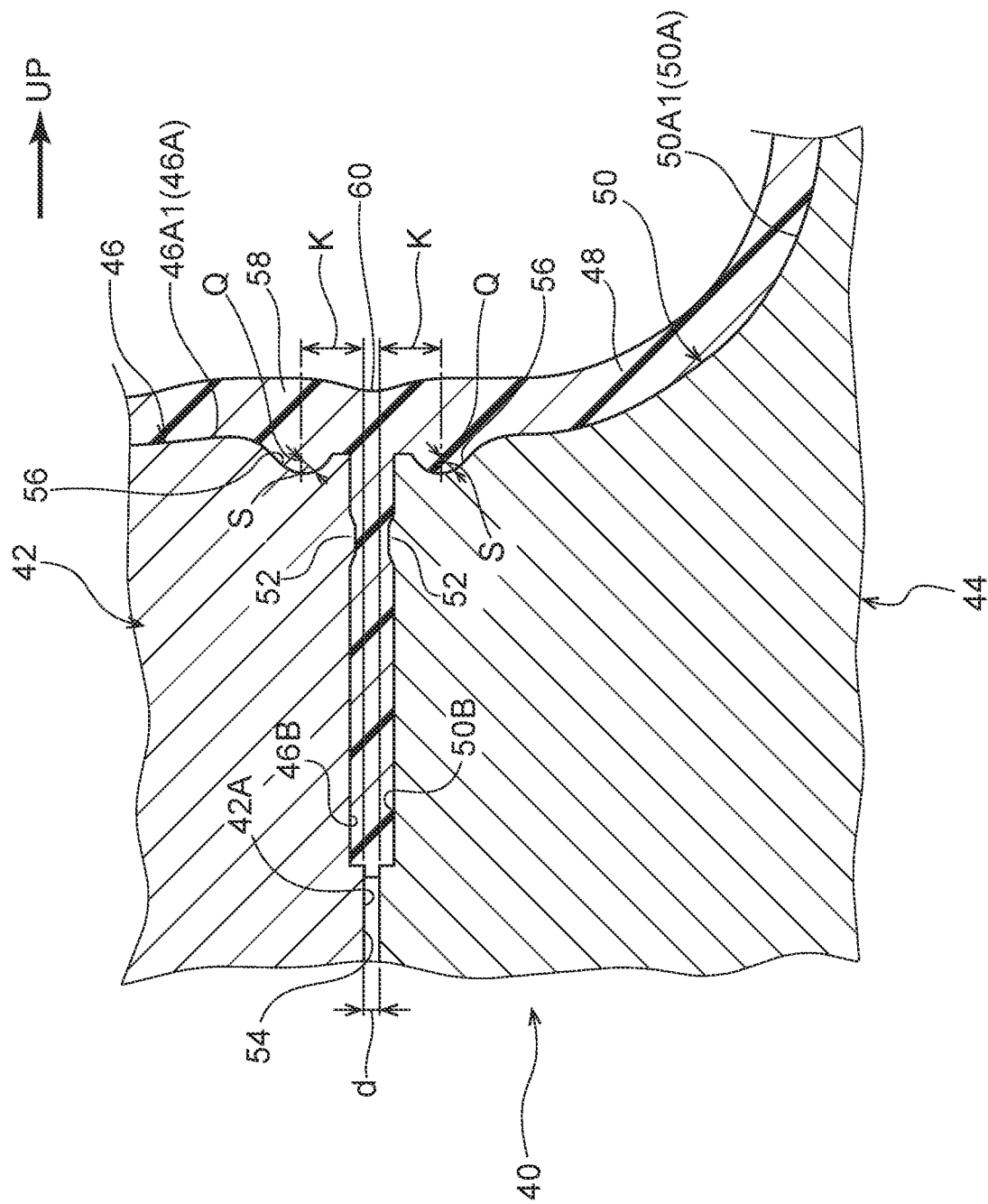

RESIN FUEL TANK AND BLOW MOLDING MOLD FOR MOLDING THE SAME

CROSS-REFERENCE TO RELATED APPLICATION

This application claims priority under 35 USC 119 from Japanese Patent Application No. 2017-5467 filed Jan. 16, 2017, the disclosure of which is incorporated by reference herein in its entirety.

BACKGROUND

Technical Field

Preferred embodiments relate to a resin fuel tank and a blow molding mold for molding the same.

Related Art

Japanese Patent Application Laid-Open (JP-A) No. 2014-148227 discloses an invention relating to a vehicle body mounting structure for a fuel tank. In this vehicle body mounting structure for a fuel tank, a bottom wall portion of the fuel tank is joined by joining means to a band lower member that is fixed to a vehicle body and that holds the fuel tank. A top wall portion of the fuel tank is joined by joining means to a vehicle body structural part. Therefore, deformation of the fuel tank due to changes in internal pressure can be suppressed.

However, in the aforementioned related art, because the fuel tank is blow molded, a notch is formed at an inner side of the fuel tank at the time of blow molding. It is thought that stress will concentrate at this notch at a time of input of load to the fuel tank from the exterior, or the like.

In detail, the above-described fuel tank is molded by a blow molding gas being blown into a tubular parison in a state in which end portions of the parison are nipped by a first half-body and a second half-body that structure a blow molding mold. When the fuel tank is molded as described above, at the time when the end portions of the parison are nipped by the blow molding mold, portions of the parison are pushed-into the inner side of the blow molding mold by the first half-body and the second half-body, respectively. As a result, in the state in which the fuel tank is molded, a pair of excessively-thick portions is formed at the inner side of the fuel tank. The aforementioned notch is formed between these excessively-thick portions. If the excessively-thick portions are large, there is the tendency for the distal end portion of the cross-sectional shape of the notch to become sharp toward the outer side of the fuel tank. Therefore, it is thought that, when load that is inputted to the fuel tank is transmitted to the notch, a large stress that is centered on the notch will be generated.

SUMMARY

In consideration of the above circumstances, an object of preferred embodiments is to provide a resin fuel tank and a blow molding mold for molding a resin fuel tank that can decrease or prevent the generation of a large stress at the time when load is inputted from the exterior.

A resin fuel tank of a first aspect of the disclosure includes: a peripheral wall portion that is configured to structure a portion of a fuel tank main body portion that is made of resin and in which fuel is stored, the peripheral wall portion having a parting line portion that is visible from an outer side of the fuel tank main body portion; and a projecting portion that is solid, is disposed along the parting line portion, and is configured to project outward, integrally with the peripheral wall portion from the peripheral wall portion toward the outer side of the fuel tank main body portion.

In accordance with the resin fuel tank of the first aspect, fuel is stored in the fuel tank main body portion that is made of resin. The fuel tank has, at the peripheral wall portion that structures a portion of the fuel tank main body portion, a parting line portion that is visible from the outer side of the fuel tank main body portion. Namely, at the time of blow molding the fuel tank, the parting line of the blow molding mold is set along the peripheral wall portion of the fuel tank main body portion, in the same way as the parting line portion.

In the blow molding process, a parting line portion is formed at a molded product due to end portions of a tubular parison being nipped by the blow molding mold. Further, when the parison is nipped by the blow molding mold, portions of the parison are pushed-into an inner side of the blow molding mold. Due thereto, a pair of excessively-thick portions will be formed at the inner side of the fuel tank main body portion of the fuel tank that is the molded product. Further, a notch is formed between these excessively-thick portions, and, if the excessively-thick portions are large, the distal end portion of the cross-sectional shape of the notch tends to become sharp toward the outer side of the fuel tank. Therefore, when load that is inputted to the fuel tank is transmitted to the notch, a large stress that is centered at the notch will be generated.

In the resin fuel tank of the first aspect, a projecting portion that is solid is disposed along the parting line portion of the fuel tank main body portion. This projecting portion projects outward, integrally with the peripheral wall portion of the fuel tank main body portion, from the peripheral wall portion toward the outer side of the fuel tank main body portion. Namely, the formation of excessively-thick portions at the inner side of the fuel tank main body portion can be suppressed by making a portion of the parison, which is pushed-into the inner side of the blow molding mold at the time of blow molding, project-out at the outer side of the fuel tank main body portion and not at the inner side of the fuel tank main body portion, and this portion structuring the projecting portion. As a result, enlargement of the notch that is formed at the inner side of the fuel tank main body portion is suppressed, and, accordingly, the distal end portion of the cross-sectional shape of the notch becoming sharp toward the outer side of the fuel tank can be suppressed.

In a resin fuel tank of a second aspect of the disclosure, in the first aspect, a thickness of a portion of the peripheral wall portion, at which the projecting portion is provided, is thicker than a thickness of a portion of the peripheral wall portion, at which the projecting portion is not provided.

In accordance with the resin fuel tank of the second aspect, at the peripheral wall portion of the fuel tank main body portion, the thickness of the portion where the projecting portion is provided is set to be thicker than the thickness of the portion where the projecting portion is not provided. The peripheral wall portion can be reinforced along the parting line portion.

In a resin fuel tank of a third aspect of the disclosure, in the first aspect or the second aspect, the projecting portion includes two projecting portions provided at two places and the parting line portion is interposed between the two projecting portions in a direction that is orthogonal to a direction in which the parting line portion extends.

In accordance with the resin fuel tank of the third aspect, the projecting portions are provided at two places at the peripheral wall portion of the fuel tank main body portion. These two projecting portions are disposed so as to interpose the parting line portion in-between in a direction that is orthogonal to the direction in which the parting line portion extends. Namely, the projecting portions can be structured by causing portions of the parison, which are pushed into the inner side of the blow molding mold at the time of molding the fuel tank, to project out at two places at the peripheral wall portion of the fuel tank main body portion.

The resin fuel tank of a fourth aspect of the disclosure, in the first aspect through the third aspect, further includes a flange portion which extends outward, integrally with the peripheral wall portion, from the peripheral wall portion toward the outer side of the fuel tank main body portion, and the flange portion structures a portion of the parting line portion.

In accordance with the resin fuel tank of the fourth aspect, the flange portion extends outward, integrally with the peripheral wall portion of the fuel tank main body portion, from the peripheral wall portion toward the outer side of the fuel tank main body portion, and this flange portion can be used in fixing the fuel tank to the vehicle body and the like. Further, the flange portion structures a portion of the parting line portion, and the projecting portion is provided along the flange portion. Note that, here, "structures a portion of the parting line portion" means that, when viewed macroscopically, widen planar portion of the parting line portion, whose main portion is structured linearly, is structured by the flange portion. Therefore, enlargement of the notch that forms at the inner side of the fuel tank main body portion can be suppressed also at the place of the fuel tank main body portion where the flange portion is provided.

A blow molding mold of a fifth aspect of the disclosure includes: a first molding mold that has a first cavity portion at which is formed a first molding surface against which is pushed a parison into which a blow molding gas is blown and that expands; and a second molding mold that has a second cavity portion at which is formed a second molding surface against which the parison is pushed, and that, together with the first molding mold, nips a peripheral edge portion of the parison, wherein a concave portion, which extends along a parting line of the first molding mold and the second molding mold, is formed at at least one of the first cavity portion or the second cavity portion.

The blow molding mold of the fifth aspect has the first molding mold, which has the first cavity portion at which the first molding surface is formed, and the second molding mold, which has the second cavity portion at which the second molding surface is formed. When, in a state in which the peripheral edge portion of a parison is nipped by the first molding mold and the second molding mold, a blow molding gas is blown into the parison and the parison inflates, the parison is pushed-against the first molding surface and the second molding surface and solidifies, and a molded product is molded. Further, in the present invention, in the state in which the first molding mold and the second molding mold are set together, a parting line is structured at the portions, where the parison is nipped, of the first molding mold and the second molding mold.

By the way, when the parison is nipped by the first molding mold and the second molding mold, portions of the parison are pushed-into the first cavity portion and the second cavity portion side by the molds, and it is thought that a pair of excessively-thick portions will form at the inner side of the molded product. Further, a notch forms between these excessively-thick portions, and, if the excessively-thick portions are large, the distal end portion of the cross-sectional shape of the notch tends to become sharp toward the outer side of the molded product. Therefore, in a case in which the molded product is a fuel tank, it is thought that load that is inputted to the fuel tank will be transmitted to the notch, and a large stress that is centered at this notch will form.

Here, in the fifth aspect, the concave portion that extends along the parting line of the first molding mold and the second molding mold is formed at at least one of the first cavity portion and the second cavity portion. Therefore, the portion of the parison, which is pushed-into the inner side of at least one of the first cavity portion and the second cavity portion, escapes into the concave portion, and the formation of excessively-thick portions at the inner side of the fuel tank can be suppressed. As a result, in the present invention, enlargement of the notch that forms at the inner side of the fuel tank is suppressed, and, accordingly, the distal end portion of the cross-sectional shape of this notch becoming sharp toward the outer side of the fuel tank can be suppressed.

A resin fuel tank of a sixth aspect of the disclosure is produced by a process including the steps of: providing a parison, and a blow molding mold having a first molding mold and a second molding mold, the first molding mold having a first cavity portion at which a first molding surface is formed, and the second molding mold having a second cavity portion at which a second molding surface is formed; forming a concave portion, that extends along a parting line of the first molding mold and the second molding mold, at the first cavity portion or the second cavity portion of the blow molding mold; in a state in which peripheral edge portions of the parison are nipped by the first molding mold and the second molding mold, blowing a blow molding gas into the parison and inflating the parison, such that a portion of the parison, which is inflated at inner sides of the first cavity portion and the second cavity portion, enters into the concave portion; and pressing the parison against the first molding surface and the second molding surface, solidifying the parison, and molding the resin fuel tank. In a state in which the first molding mold and the second molding mold are set together, a parting line portion is formed at a portion of the parison that is nipped by the first molding mold and the second molding mold, and the portion of the parison that entered into the concave portion projects outward from a peripheral wall portion of a fuel tank main body portion of the resin fuel tank, and becomes a projecting portion that is solid and integral with the peripheral wall portion and that runs along the parting line portion formed at an outer surface of the peripheral wall portion.

As described above, the resin fuel tank of the first aspect of the present disclosure has the excellent effect that generation of a large stress at the time when load is inputted from the exterior can be suppressed.

The resin fuel tank of the second aspect of the present disclosure has the excellent effect that stress concentrating at the peripheral portion of the parting line portion when load is inputted from the exterior can be suppressed.

The resin fuel tank of the third aspect of the present disclosure has the excellent effect that the effect of suppressing enlargement of the notch that forms at the inner side can be improved.

The resin fuel tank of the fourth aspect of the present disclosure has the excellent effect that the generation of a large stress at the peripheral portion of the place that is fixed to the vehicle body can be suppressed.

The blow molding mold of the fifth aspect of the present disclosure has the excellent effect that a fuel tank, at which generation of a large stress at the time when load is inputted from the exterior can be suppressed, can be molded.

The resin fuel tank of the sixth aspect of the present disclosure has the excellent effect that generation of a large stress at the time when load is inputted from the exterior can be suppressed.

BRIEF DESCRIPTION OF THE DRAWINGS

Preferred embodiments will be described in detail based on the following figures, wherein:

FIG. 3A is a side view showing the structure of the periphery of the flange portion of the resin fuel tank relating to the exemplary embodiment, and shows a state in which the flange portion is seen from the outer side of the resin tank (a view seen in the direction of arrow 3A of FIG. 1);

FIG. 3B shows a state in which the flange portion is seen from the inner side of the resin fuel tank (a view seen in the direction of arrow 3B of FIG. 1);

FIG. 7 is a cross-sectional view showing the structure of a blow molding mold relating to the exemplary embodiment.

DETAILED DESCRIPTION

An example of an embodiment of a resin fuel tank relating to the present invention is described hereinafter by using FIG. 1 through FIG. 6, and then a blow molding mold for molding the resin fuel tank is described by using FIG. 7. Note that arrow FR that is shown appropriately in the respective drawings that are used in describing the resin fuel tank indicates the vehicle front side, arrow UP indicates the vehicle upper side, and arrow RH indicates the vehicle transverse direction right side.

Figure 5:
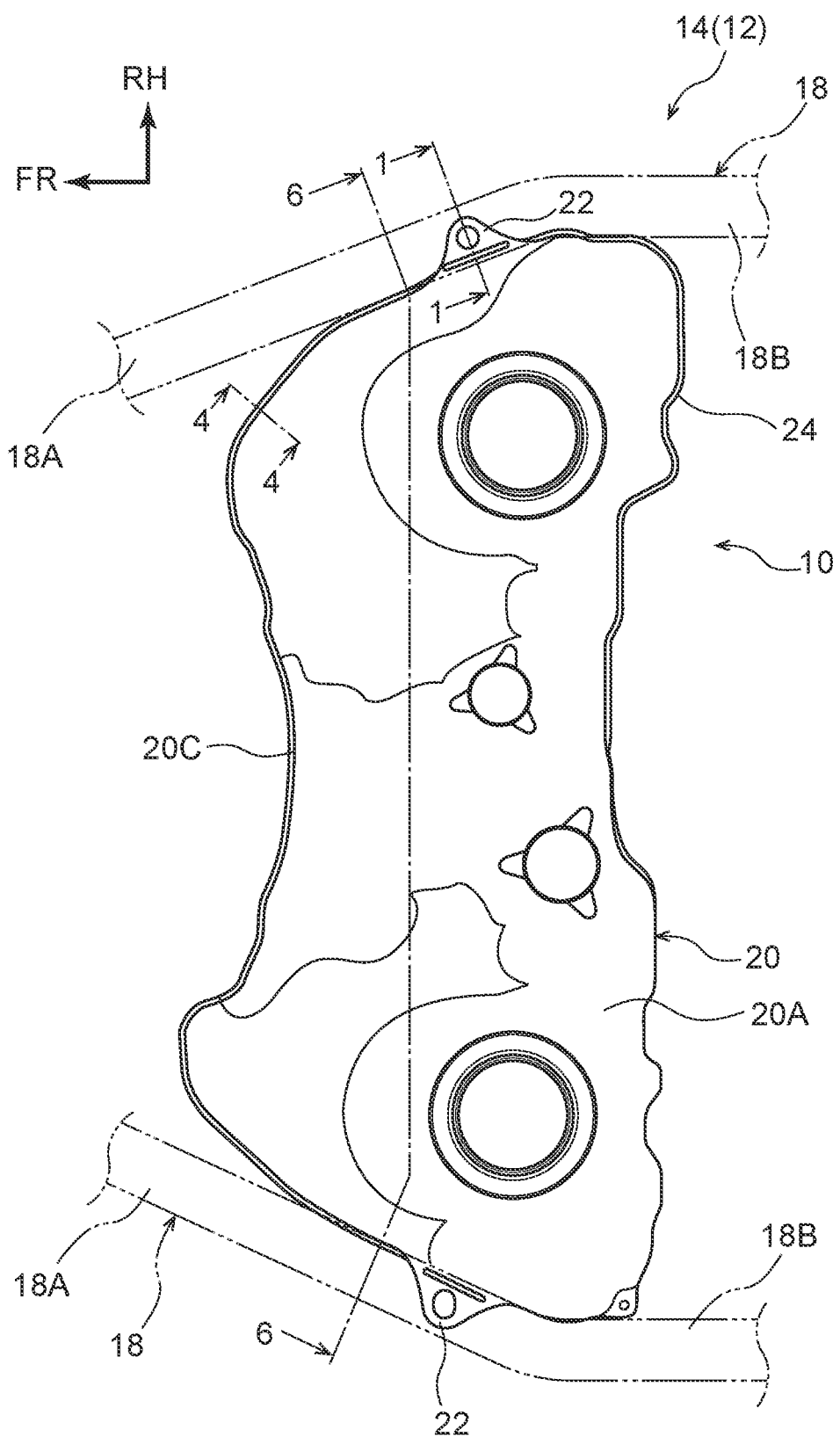
FIG. 5 is a plan view showing the structure of the resin fuel tank relating to the exemplary embodiment.
Figure 6:
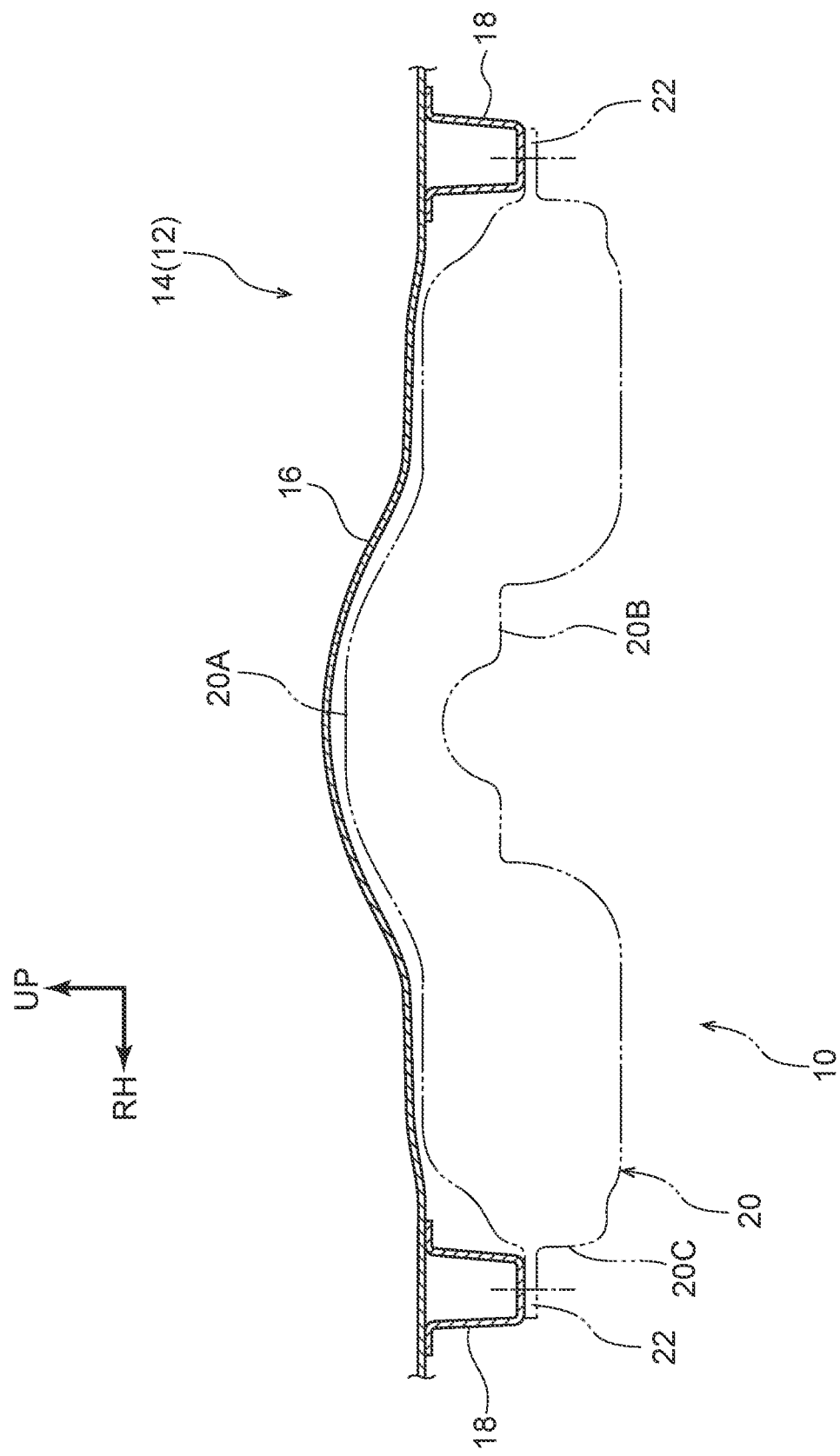
FIG. 6 is a cross-sectional view (a cross-sectional view showing the state cut along line 6-6 of FIG. 5) showing the state in which the resin fuel tank relating to the exemplary embodiment is mounted to the vehicle body.

First, by using FIG. 5 and FIG. 6, description is given of the structure of a vehicle body 14 of a vehicle 12 in which a fuel tank 10, which serves as a resin fuel tank relating to the present embodiment, is installed. The vehicle body 14 has a floor panel 16 that is formed by press-molding a steel plate, and that structures a part of a floor portion that is at the vehicle lower side of the vehicle body 14, and that extends in the vehicle longitudinal direction and the vehicle transverse direction as seen along the vehicle vertical direction.

A pair of left and right rear side members 18 that are made of steel are disposed at the vehicle transverse direction outer side portions of the floor panel 16 along the vehicle lower side surface of the floor panel 16. The rear side member 18 is structured to include an unillustrated member front portion, a member center portion 18A, and a member rear portion 18B that are disposed in that order from the vehicle front side.

In detail, the member front portion structures the vehicle front side portion of the rear side member 18, and extends rectilinearly in the vehicle longitudinal direction. The member center portion 18A extends from the member front portion so as to extend toward the vehicle transverse direction outer side. The member rear portion 18B extends toward the vehicle rear side from a vehicle rear side portion of the member center portion 18A. The member rear portion 18B extends rectilinearly in the vehicle longitudinal direction along a peripheral edge portion that is at the vehicle transverse direction outer side of the floor panel 16. Note that the rear side members 18 are joined to the floor panel 16 at unillustrated joined portions that are formed by welding or the like, and closed cross-section structural portions are structured by the rear side members 18 and the floor panel 16.

The fuel tank 10 is disposed at the lower side of the floor panel 16, and more concretely, at a position of overlapping an unillustrated rear seat as seen from the vehicle vertical direction. A main portion of the fuel tank 10 is accommodated between the rear side members 18.

The fuel tank 10 has a fuel tank main body portion 20 and a pair of flange portions 22 that are described later, and is made of high-density polyethylene. The fuel tank main body portion 20 is structured to include a top wall portion 20A that structures a vehicle upper side portion, a bottom wall portion 20B that structures a vehicle lower side portion, and a peripheral wall portion 20C that structures an outer peripheral portion and that connects the top wall portion 20A and the bottom wall portion 20B.

The top wall portion 20A and the bottom wall portion 20B respectively are shaped as substantially trapezoidal plates whose widths increase toward the vehicle rear side as seen in the vehicle vertical direction. The vehicle transverse direction central portions thereof bulge-out toward the vehicle upper side. Namely, the fuel tank is formed as a so-called saddle-type tank at which a concave portion for placement of a propeller shaft and the like is provided at a vehicle lower side portion of the vehicle transverse direction central portion of the fuel tank 10.

A closed space is formed at an inner side of the fuel tank main body portion 20 that is structured as described above. Fuel such as gasoline or the like can be stored in the fuel tank main body portion 20. An unillustrated pump module, filter, and the like are mounted at the inner side of the fuel tank main body portion 20.

Figure 1:
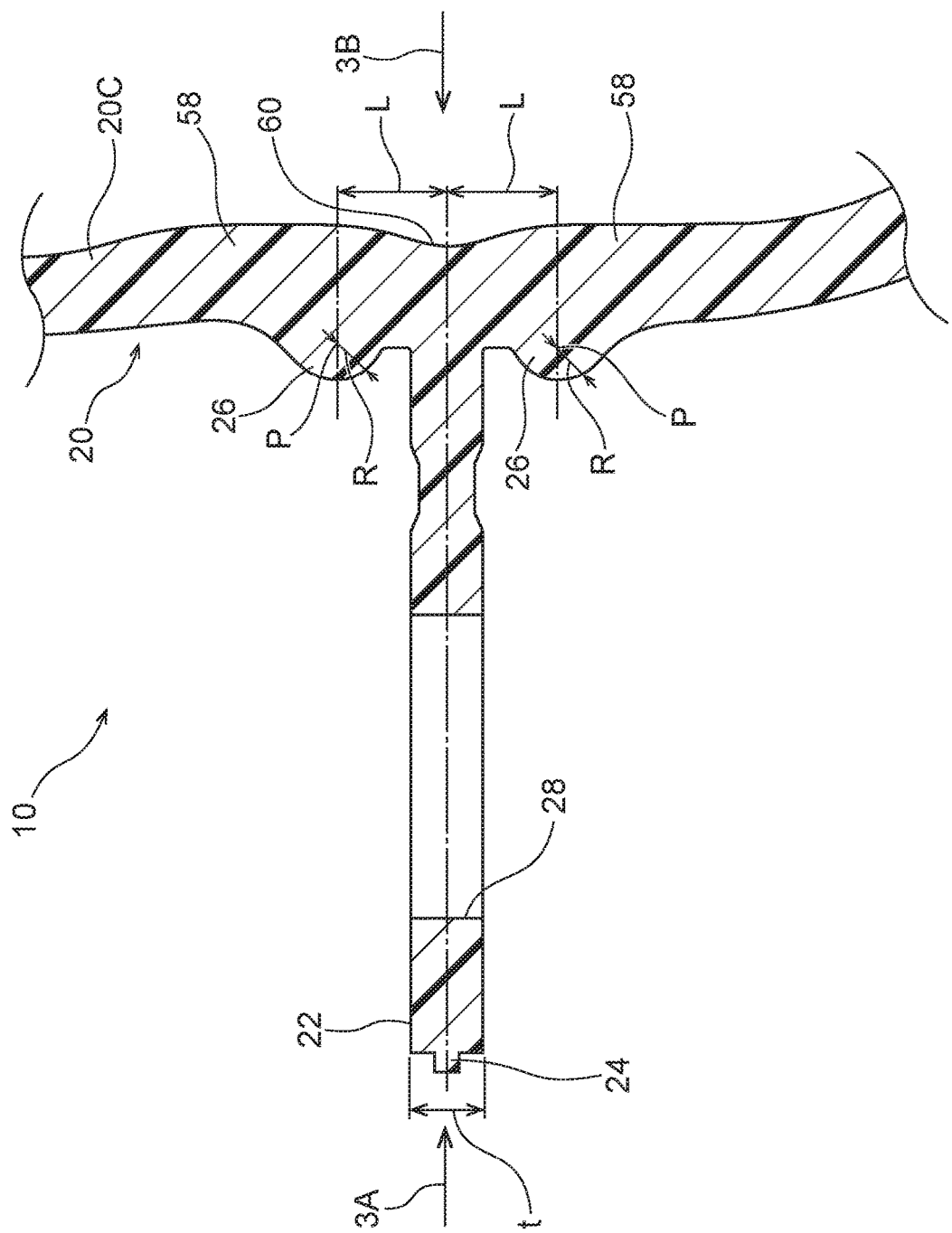
FIG. 1 is an enlarged sectional view (a cross-sectional view showing the state cut along line 1-1 of FIG. 5) showing the structure of the periphery of a flange portion of a resin fuel tank relating to an exemplary embodiment.
Figure 4:
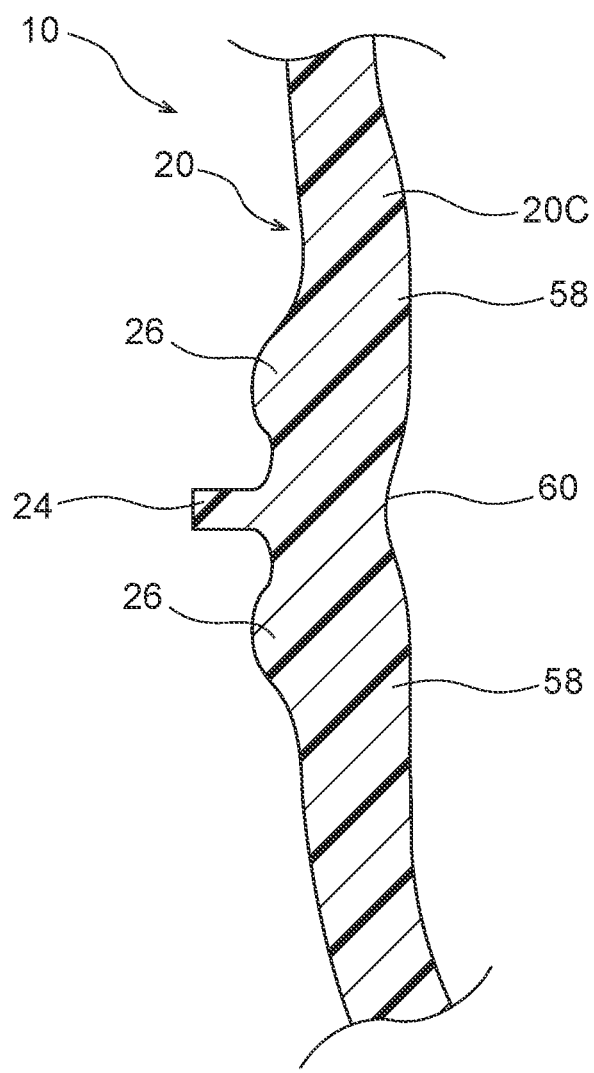
FIG. 4 is an enlarged sectional view (a cross-sectional view showing the state cut along line 4-4 of FIG. 5) showing the structure of a peripheral wall portion of the resin fuel tank relating to the exemplary embodiment.

Here, in the present embodiment, as described above, the fuel tank 10 is formed by blow molding. As shown in FIG. 1 and FIG. 4, the fuel tank 10 has, at the peripheral wall portion 20C, a parting line portion 24 that is the trace of a parting line 54 (see FIG. 7) of the mating surfaces of a first molding mold 42 and a second molding mold 44 of a blow molding mold 40. Further, the fuel tank 10 has projecting portions 26 that run along the parting line portion 24 and that are formed at the peripheral wall portion 20C of the fuel tank main body portion 20. The structures of the parting line portion 24 and the projecting portions 26 are described in detail hereinafter.

The parting line portion 24 is visible from an outer side of the fuel tank main body portion 20. Basically, the parting line portion 24 is an annular shape that runs along the peripheral wall portion 20C as seen in the vehicle transverse direction, but may be formed at discontinuous places. Further, portions of the parting line portion 24 are formed also at the flange portions 22 that are used in the fixing of the fuel tank 10.

The flange portions 22 extend-out integrally with the peripheral wall portion 20C toward the outer side of the fuel tank main body portion 20. As seen from the vehicle upper side, the flange portions 22 are formed in the shapes of triangular plates whose widths decrease toward the outer side of the fuel tank main body portion 20. Insert-through portions 28 are formed in central portions of the flange portions 22. Further, portions of the parting line portion 24 are formed at peripheral edge portions of the flange portions 22. In other words, the flange portions 22 are structuring portions of the parting line portion 24. Note that "structuring portions of the parting line portion 24" here means that, when viewed macroscopically, widen planar portions of the parting line portion 24, whose main portion is structured linearly, are structured by the flange portions 22.

Figure 2:
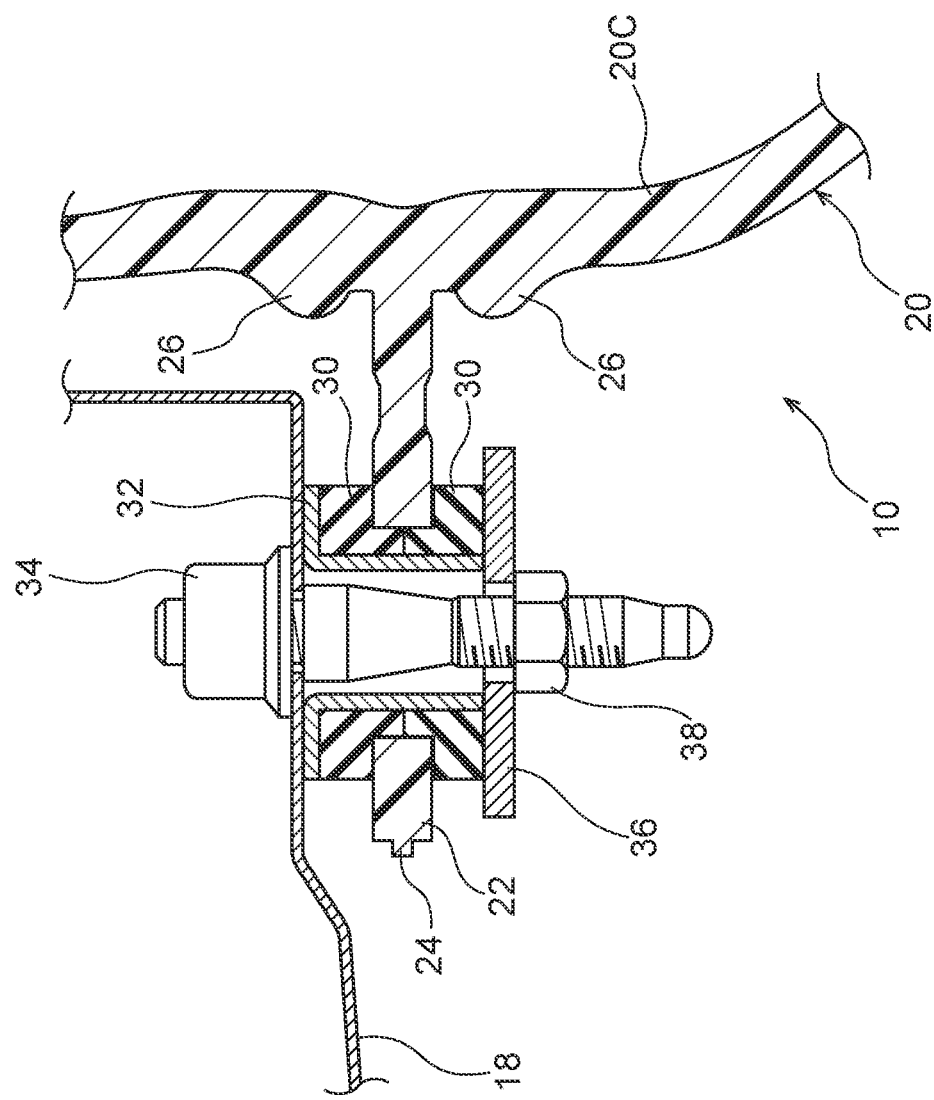
FIG. 2 is an enlarged sectional view (a cross-sectional view corresponding to FIG. 1) showing a state in which the resin fuel tank relating to the exemplary embodiment is mounted to a vehicle body.

Further, as shown in FIG. 2, a pair of boss members 30 that are made of rubber are fit into the insert-through portion 28 of the flange portion 22 from the vehicle vertical direction both sides. A collar 32 is fit, from the vehicle upper side, into insert-through portions that are formed in the central portions of the boss members 30. Moreover, in the state in which the shaft portion of a stud bolt 34 that is provided at the rear side member 18 is inserted-through the collar 32, this shaft portion is inserted-through a washer 36, and, due to a nut 38 being fastened to this shaft portion from the vehicle lower side of the washer 36, the fuel tank 10 is mounted to the vehicle body 14. Note that an unillustrated band and the like also are used in the mounting of the fuel tank 10.

Returning to FIG. 4, the projecting portions 26 are solid and integral with the peripheral wall portion 20C of the fuel tank main body portion 20, and project out substantially in the vehicle transverse direction from the peripheral wall portion 20C toward the outer side of the fuel tank main body portion 20. The projecting portions 26 are provided at places of the peripheral wall portion 20C where the flange portions 22 are not provided, at two places with the parting line portion 24 interposed therebetween in a direction orthogonal to the direction in which the parting line portion 24 extends, and the projecting portions 26 extend along the parting line portion 24. In other words, the projecting portions 26 are provided at both a vehicle upper side and a vehicle lower side of the parting line portion 24.

As shown in FIG. 1, at the place of the peripheral wall portion 20C where the flange portion 22 is provided, the projecting portions 26 are provided at two places with the flange portion 22 interposed therebetween in the plate thickness direction of the flange portion 22, and extend along the proximal end portion of the flange portion 22. Note that, as shown in FIG. 3A, when the fuel tank main body portion 20 is viewed along the direction of extension of the flange portion 22, the projecting portions 26 are in a state of extending along the parting line portion 24 also at the place of the peripheral wall portion 20C where the flange portion 22 is provided.

In further detail, the cross-sectional shape of the projecting portion 26 as seen in the direction of extension of the projecting portion 26 is a semicircular shape that is convex toward the outer side of the fuel tank main body portion 20. As an example, given that the thickness of the flange portion 22 is t (mm), and the distance from the thickness direction center of the flange portion 22 to center of curvature P in a cross-section of the projecting portion 26 is L (mm), the relationship of $0.70 < L/t < 1.8$ is established therebetween.

Moreover, as an example, radius of curvature R (mm) of the cross-section of the projecting portion 26 is set to 3 mm to 5 mm. Note that, at the peripheral wall portion 20C of the fuel tank main body portion 20, the thickness of the portion where the projecting portion 26 is formed is set to be thicker than the thickness of the portion where the projecting portion 26 is not formed.

The structure of the blow molding mold 40 that is used in the blow molding of the fuel tank 10 is described next by using FIG. 7. This blow molding mold 40 is formed of metal, and is structured by a first molding mold 42 and a second molding mold 44. Note that arrow UP that is shown in FIG. 7 indicates the upper side of the blow molding mold 40. In the following description, the direction that is orthogonal to arrow UP in FIG. 7 is the depth direction of the blow molding mold 40.

A first cavity portion 46 is formed at the first molding mold 42. The first cavity portion 46 is structured to include a large cavity portion 46A and a small cavity portion 46B. A first molding surface 46A1 is formed at the large cavity portion 46A. A parison 48, into which a blow molding gas is blown, is pushed-against the first molding surface 46A1, whereby a vehicle upper side portion of the fuel tank main body portion 20 is molded. Further, the small cavity portion 46B is the portion at which the flange portion 22 of the fuel tank 10 is molded, and is a concave portion that is triangular and whose large cavity portion 46A side is open.

A second cavity portion 50 is formed at the second molding mold 44. The second cavity portion 50 is structured to include a large cavity portion 50A and a small cavity portion 50B. A second molding surface 50A1 is formed at the large cavity portion 50A. A parison 48, into which a blow molding gas is blown, is pushed-against the second molding surface 50A1, whereby a vehicle lower side portion of the fuel tank main body portion 20 is molded. Further, the small cavity portion 50B is structured similarly to the small cavity portion 46B. The flange portion 22 is molded due to the parison 48 being nipped by the small cavity portion 46B and the small cavity portion 50B.

Convex portions 52 are formed at the respective molding surfaces of the small cavity portions 46B, 50B, and are wedges with respect to the parison 48 at the time when the first molding mold 42 and the second molding mold 44 are set together. Further, as described above, when the first molding mold 42 and the second molding mold 44 are set together, the parison 48 is nipped by the small cavity portions 46B, 50B. Therefore, the small cavity portions 46B, 50B can also be understood as structuring portions of the parting line 54 of the blow molding mold 40.

Here, the present embodiment has a feature that concave portions 56 that extend along the parting line 54 are formed at the first molding mold 42 and the second molding mold 44 respectively. The structure of the concave portion 56 is described in detail hereinafter. Because the concave portion 56 that is provided at the first molding mold 42 and the concave portion 56 that is provided at the second molding mold 44 are structured similarly, only the concave portion 56 that is provided at the first molding mold 42 is described.

Although not illustrated directly, the concave portion 56 is disposed at a place where the small cavity portion 46B is not provided, so as to run along the peripheral edge portion that is at the large cavity portion 46A side of the parting line 54 and so as to be apart from this peripheral edge portion by a predetermined interval in the depth direction of the large cavity portion 46A. On the other hand, at the place where the small cavity portion 46B is provided, the concave portion 56 is disposed so as to run along the peripheral edge portion that is at the large cavity portion 46A side with respect to the small cavity portion 46B and so as to be apart from this peripheral edge portion by a predetermined interval in the depth direction of the large cavity portion 46A.

More specifically, the cross-sectional shape of the concave portion 56 as seen in the extending direction of the concave portion 56 is formed in a circumferential shape that is convex toward an outer side of the first molding mold 42 (an opposite side to a large cavity portion 46A side). Further, given that a width of the parting line 54 in the depth direction of the large cavity portion 46A is d (mm), and a dimension in the depth direction from a structuring surface 42A of the first molding mold 42, that structures the parting line 54, to center of curvature Q of the cross-section of the concave portion 56 is K (mm), the relationship L=K+d/2 is established between these dimensions and the above-described distance L. Moreover, radius of curvature S of the cross-section of the concave portion 56 is set to a length that is the same as radius of curvature R of the projecting portion 26.

Operation and Effects of Present Embodiment

The operation and effects of the present embodiment are described next.

In the present embodiment, fuel is stored in the fuel tank main body portion 20 of the fuel tank 10 that is made of resin. Further, as shown in FIG. 1 and FIG. 4, the fuel tank 10 has, at the peripheral wall portion 20C that structures a portion of the fuel tank main body portion 20, the parting line portion 24 that is visible from the outer side of the fuel tank main body portion 20. Namely, at the time of blow molding the fuel tank 10, the parting line 54 of the blow molding mold 40 is, in the same way as the parting line portion 24, set along the peripheral wall portion 20C of the fuel tank main body portion 20.

To describe this more concretely by using FIG. 7 as well, the blow molding mold 40 has the first molding mold 42, which has the first cavity portion 46 at which the first molding surface 46A1 is formed, and the second molding mold 44, which has the second cavity portion 50 at which the second molding surface 50A1 is formed. When, in the state in which the peripheral edge portions (the end portions) of the parison 48 is nipped by the first molding mold 42 and the second molding mold 44, a blow molding gas is blown into the parison 48 and the parison 48 inflates, the parison 48 is pushed-against the first molding surface 46A1 and the second molding surface 50A1 and is solidified, and the fuel tank 10 is molded. Further, in the state in which the first molding mold 42 and the second molding mold 44 are set together, the parting line portion 24 is formed at the portion of the parison 48 that is nipped by the first molding mold 42 and the second molding mold 44.

As described above, the parting line portion 24 is formed at the fuel tank 10 due to the peripheral edge portion of the parison 48 that is tubular being nipped by the blow molding mold 40 in the blow molding process. Further, as shown in FIG. 1 and FIG. 3B as well, when the parison 48 is nipped by the blow molding mold 40, portions of the parison 48 are pushed into the inner side of the blow molding mold 40 (the large cavity portion 46A side and a large cavity portion 50A side), and a pair of excessively-thick portions 58 will be formed at the inner side of the molded fuel tank main body portion 20. Further, a notch 60 is formed between these excessively-thick portions 58, and, if the excessively-thick portions 58 are large, a distal end portion of the cross-sectional shape of the notch 60 tends to become sharp toward the outer side of the fuel tank 10. Therefore, when load, which is inputted from the vehicle body 14 to the fuel tank 10 at the time of a collision of the vehicle 12 or the like, is transmitted to the notch 60, a large stress that is centered around the notch 60 may be generated.

In the present embodiment, the concave portions 56 that extend along the parting line 54 of the first molding mold 42 and the second molding mold 44 are formed at the first cavity portion 46 and the second cavity portion 50 of the blow molding mold 40. Therefore, portions of the parison 48 that are pushed-into the inner sides of the first cavity portion 46 and the second cavity portion 50 can escape into these concave portions 56.

Further, the portions of the parison 48 that escape into the concave portions 56 are made to project-out from the peripheral wall portion 20C of the molded fuel tank main body portion 20 toward the outer side of the fuel tank main body portion 20, and become the projecting portions 26 that are solid and integral with the peripheral wall portion 20C and that run along the parting line portion 24. Namely, in the present embodiment, due to the portions of the parison 48, which are pushed-into the inner side of the blow molding mold 40, being made to project-out at the outer side of the fuel tank main body portion 20 and not at the inner side of the fuel tank main body portion 20, and these portions structuring the projecting portions 26, forming of the excessively-thick portions 58 at the inner side of the fuel tank main body portion 20 can be suppressed.

As a result, in the present embodiment, enlargement of the notch 60 that forms at the inner side of the fuel tank main body portion 20 is suppressed, and thus, the distal end portion of the cross-sectional shape of the notch 60 becoming sharp toward the outer side of the fuel tank 10 can be prevented. Accordingly, in the present embodiment, at the time when load is inputted to the fuel tank 10 from the exterior, a large stress being generated at the fuel tank 10 can be decreased or prevented.

Further, in the present embodiment, at the peripheral wall portion 20C of the fuel tank main body portion 20, the thickness of the portions where the projecting portions 26 are provided is set to be thicker than the thickness of the portions where the projecting portions 26 are not provided, and the peripheral wall portion 20C can be reinforced along the parting line portion 24. Therefore, stress concentrating at the peripheral portion of the parting line portion 24 when load is inputted to the fuel tank 10 from the exterior can be decreased or prevented.

Moreover, in the present embodiment, the projecting portions 26 are provided at two places at the peripheral wall portion 20C of the fuel tank main body portion 20. These projecting portions 26 are disposed so as to interpose the parting line portion 24 in-between in a direction that is orthogonal to the direction in which the parting line portion 24 extends. Thus, the portions of the parison 48, which are pushed-into the inner side of the blow molding mold 40 at the time of molding the fuel tank 10, can be made to project-out at two places at the peripheral wall portion 20C of the fuel tank main body portion 20, and can structure the projecting portions 26. Accordingly, in the present embodiment, the effect of suppressing enlargement of the notch 60 that forms at the inner side of the fuel tank main body portion 20 can be improved.

In addition, in the present embodiment, the flange portions 22, that is integral with the peripheral wall portion 20C, extend out from the peripheral wall portion 20C toward the outer side of the fuel tank main body portion 20, and these flange portions 22 can be used in fixing the fuel tank 10 to the vehicle body 14. Further, the flange portions 22 structure portions of the parting line portion 24, and the projecting portions 26 are provided along these flange portions 22. Therefore, enlargement of the notch 60 that forms at the inner side of the fuel tank main body portion 20 can also be decreased or prevented at the places of the fuel tank main body portion 20 where the flange portions 22 are provided. Accordingly, in the present embodiment, large stresses being generated at the peripheral portions of the places of the fuel tank 10 that are fixed to the vehicle body 14 can be decreased or prevented.

Supplemental Description of the Embodiment (1) In the above-described embodiment, when the fuel tank 10 is molded at the blow molding mold 40, the parison 48 is disposed such that the portion that corresponds to the vehicle transverse direction right side of the fuel tank 10 is at the lower side of the blow molding mold 40. When the fuel tank 10 is molded in this way, the excessively-thick portions 58 is formed large at, and the notch 60 tends to become sharp at, the portion of the fuel tank 10 which portion was positioned at the lower side within the blow molding mold 40, i.e., the portion is located at the vehicle transverse direction right side of the fuel tank 10. On the other hand, the excessively-thick portion 58 is small or is not formed at, and formation of the notch 60 tends to be suppressed at, the portion of the fuel tank 10 which portion was positioned at the upper side within the blow molding mold 40. Accordingly, the concave portions 56 may be formed only at a lower side of the parting line 54 within the blow molding mold 40. Further, in accordance with the structure of the blow molding mold 40 and the like, the parting line portion 24 may be provided along the entire parting line 54, or the parting line portion 24 may be provided at only the peripheral portions of the flange portions 22.

(2) Further, in the above-described embodiment, the projecting portions 26 are disposed so as to interpose the parting line portion 24 between the projecting portions 26 in a direction that is orthogonal to the direction in which the parting line portion 24 extends. However, embodiments are not limited to this. For example, the projecting portion 26 may be provided at only the vehicle upper side or the vehicle lower side of the parting line portion 24, in accordance with the positional relationship between the fuel tank 10 and the vehicle body 14, or the mounted state, or the like.

(3) Moreover, although the cross-sectional shape of the projecting portion 26 is semicircular in the above-described embodiment, embodiments are not limited to this, and the cross-sectional shape of the projecting portion 26 may be changed appropriately in accordance with the structure of the blow molding mold 40 or the like. Note that, in the above-described embodiment, at the peripheral wall portion 20C of the fuel tank main body portion 20, the thickness of the portions where the projecting portions 26 are provided is set to be thicker than the thickness of the portions where the projecting portions 26 are not provided. However, embodiments are not limited to this. For example, in accordance with the shape of the peripheral wall portion 20C or the like, there may be a structure in which the thickness of the peripheral wall portion 20C is uniform regardless of the absence or presence of the projecting portions 26.

What is claimed is:

1. A resin fuel tank, produced by a process comprising the steps of:
   providing a parison, and a blow molding mold having a first molding mold and a second molding mold, the first molding mold having a first cavity portion at which a first molding surface is formed, and the second molding mold having a second cavity portion at which a second molding surface is formed;
   forming a concave portion, that extends along a parting line of the first molding mold and the second molding mold, at the first cavity portion or the second cavity portion of the blow molding mold;
   in a state in which peripheral edge portions of the parison are nipped by the first molding mold and the second molding mold, blowing a blow molding gas into the parison and inflating the parison, such that a portion of the parison, which is inflated at inner sides of the first cavity portion and the second cavity portion, enters into the concave portion; and
   pressing the parison against the first molding surface and the second molding surface, solidifying the parison, and molding the resin fuel tank, wherein:
   in a state in which the first molding mold and the second molding mold are set together, a parting line portion is formed at a portion of the parison that is nipped by the first molding mold and the second molding mold, and
   the portion of the parison that entered into the concave portion projects outward from a peripheral wall portion of a fuel tank main body portion of the resin fuel tank, and becomes a projecting portion that is solid and integral with the peripheral wall portion and that runs along the parting line portion formed at an outer surface of the peripheral wall portion.

* * * * *